Sept. 4, 1962 N. TASLITT ETAL 3,052,205
APPARATUS FOR PRODUCING UNDERWATER ACOUSTIC SIGNALS
Filed Feb. 15, 1956 2 Sheets-Sheet 1

INVENTORS
N. TASLITT
W. BYRD Jr.

BY
ATTORNEYS

Sept. 4, 1962   N. TASLITT ETAL   3,052,205
APPARATUS FOR PRODUCING UNDERWATER ACOUSTIC SIGNALS
Filed Feb. 15, 1956   2 Sheets-Sheet 2
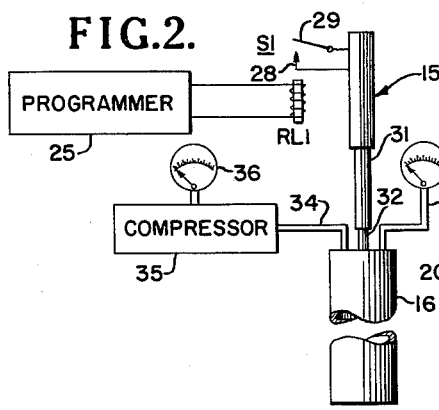
FIG.2.
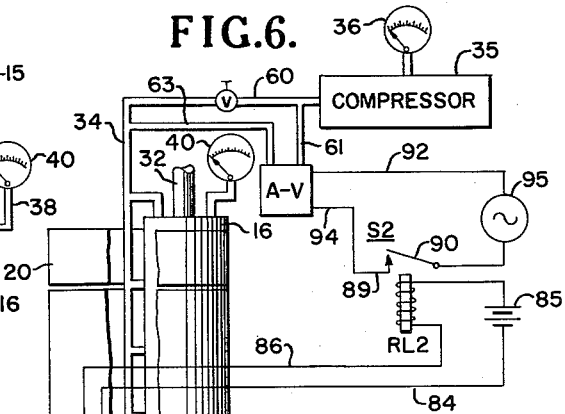
FIG.6.
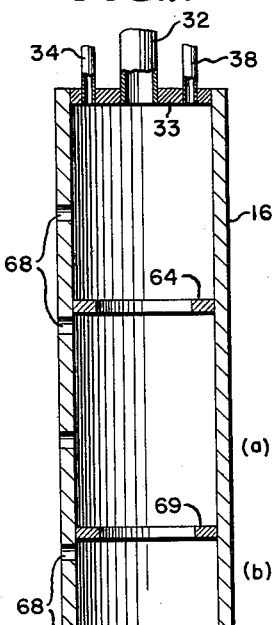
FIG.7.
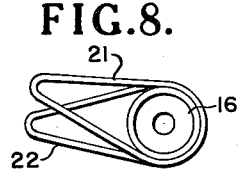
FIG.8.
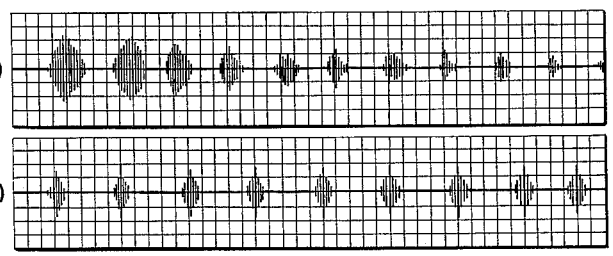
FIG.9.
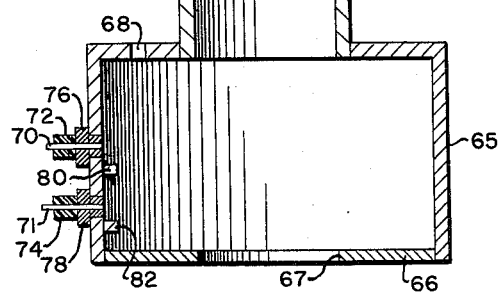
INVENTORS
N. TASLITT
W. BYRD JR.
BY
ATTORNEYS

United States Patent Office 3,052,205
Patented Sept. 4, 1962

3,052,205
APPARATUS FOR PRODUCING UNDERWATER ACOUSTIC SIGNALS
Norman Taslitt, Adelphi, Md., and William Byrd, Jr., Princeton, N.J., assignors to the United States of America as represented by the Secretary of the Navy
Filed Feb. 15, 1956, Ser. No. 565,747
12 Claims. (Cl. 116—27)
(Granted under Title 35, U.S. Code (1952), sec. 266)

The invention described herein may be manufactured and used by or for the Government of the United States of America for governmental purposes without the payment of any royalties thereon or therefor.

This invention relates to method and apparatus for actuating or rendering passive, acoustic mines, and more particularly to method and means for firing, or rendering passive, acoustic mines immersed in a body of water by firing bullets at a predetermined program of precise rates into the water through an air-filled tube so that the bullets strike the water at a point other than the normal surface of the water.

For many purposes, especially in traversing enemy waters and in clearing mine fields, it has been found necessary to mine sweep an area of water suspected of containing, or known to contain mines. In other instances, for example, to make possible the safe passage of ships over acoustic mines and during recovery operations of acoustic mines, it is necessary to render the acoustic mines passive. Also, those concerned with the development of acoustic mines have long recognized the need for a reliable and inexpensive method of testing the vulnerability of newly developed acoustic mines.

Generally, acoustic mines are characterized by firing mechanisms which are responsive to acoustic signals within a specific frequency spectrum and of progressively increasing intensities, which type of signals are produced by the approach of a vessel. Also, acoustic mine mechanisms usually employ a protect or anti-countermine feature which temporarily disables the mine firing mechanism and causes the mine to become temporarily passive upon receipt of strong bursts of sound, thereby preventing spurious fire actuation from occurring. In other words, a single strong acoustic impulse is capable of rendering an acoustic mine passive; whereas, to fire an acoustic mine, a series of acoustic impulses of progressively increasing amplitude and of frequencies within a predetermined frequency spectrum is required.

It is an established fact that acoustic signals caused by underwater explosions are readily propagated both through the water and through the bottom structure. The transient nature, broad frequency spectrum and high peak strength of these explosively produced signals are such as to cause response in acoustic mine mechanisms over wide distances.

Heretofore, in methods employed in firing or rendering mines passive, advantage has been taken of the knowledge of the responsive nature of acoustic mine mechanisms and of the character of explosively produced acoustic signals to which acoustic mine mechanisms are responsive. In the past, in order to render a mine passive, highly charged explosives such, for example, as hand grenades or time delayed detonators have been detonated underwater at time spaced intervals in the immediate vicinity of acoustic mines to produce strong pulse acoustic signals to which the anti-countermine mechanisms respond, thereby rendering the mines temporarily passive. Though these methods have been employed with some degree of success, they have not been entirely satisfactory due to limited effective range and fortuitous effectiveness.

Since acoustic mine firing mechanisms are susceptible to underwater signals of increasing intensity, mine sweeping operations have previously employed the technique of detonating strings of explosive charges at accurately timed intervals to produce a succession of transient signals, each of increasing amplitude. Though this technique has been found effective, the procedure for preparing the strings is tedious, laborious, and hazardous, and in addition presents high explosive stowage problems. Furthermore, the likelihood of misfires is ever present and frequently occurs. Moreover, due to the fact that the time-consuming procedure for preparing the strings and occasional misfires result in the accumulation of copious and expensive comprehensive data, this technique is unsatisfactory for testing the vulnerability of newly developed acoustic mines.

The general purpose of this invention is to provide a new and improved method and apparatus for acoustic mine sweeping and countermeasuring operations, which method and apparatus have a more extensive effective range than heretofore obtained and which avoid the unreliability and complexities encountered by previously employed methods.

More explicitly, the present invention contemplates the provision of acoustic mine sweeping method and apparatus therefor which are reliably efficient, versatile, readily available, and extensively maneuverable. In addition, the apparatus employed for practicing the method herein disclosed is inexpensive, simple in construction, easily installed and maintained, and has low operational manpower requirements. Moreover, the apparatus of the invention may be used to afford acoustic protection to either merchant or combatant ships and lends itself easily to coordinated control. As to effective range, the apparatus herein disclosed has large range and wide coverage relative to sweep gear previously employed.

In addition to the foregoing minesweeping capabilities, the method and means of the instant invention may be reliably and inexpensively employed in testing the vulnerability of known and new acoustic mines to minesweeping and countermeasure operations.

It is a generally known phenomenon that, the deeper a sound is produced and propagated in water, the greater is the intensity thereof. The present invention proposes to utilize this phenomenon by producing acoustic signals at underwater depths and varying these depths during the production of acoustic signals to vary the amplitudes thereof in a progessively increasing manner correlative to acoustic signals produced by a vessel approaching a mine.

In accordance with the general method of the present invention to sweep, or render passive, mines immersed in a body of water by producing underwater acoustic signals a volume of water is displaced from the mine-containing body of water to form an air-filled cavity extending from the surface of the body of water to a finite depth to define an air-water interface at the finite depth, and then propelling high velocity missiles, such as bullets, explosive point-contact projectiles, or the like, at time spaced intervals through the air-filled cavity to produce acoustic signals upon impact with the body of water at the aforestated air-water interface. If it is desired only to render mines passive, the air-filled cavity is extended to a depth sufficient to anti-countermine mines within a desired range, the depth required being determined by the effective anti-countermine range desired, since the greater the range desired the greater the depth required; and thereafter, while maintaining the depth constant, missiles are propelled through the cavity at time spaced intervals to produce underwater time-spaced acoustic pulses of large but substantially constant amplitude to which anti-countermine mechanisms are responsive. In order to fire an acoustic mine by underwater signals produced in accordance with the method of the invention, the air-filled cavity is extended to a predetermined depth and, while gradually increasing the depth, propelling missiles through the air-filled cavity in variably programmed groups of uniform time intervals with a predetermined number of missiles in each group, the uniform time intervals of succeeding groups being incrementally decreased, whereby a series of underwater acoustic signals of progressively increasing intensity and increasing frequency are produced.

In order to practice the mine sweeping method of the present invention, the present invention contemplates firing a program of precisely timed shots through an air filled tube which is partially submerged at a predetermined angle of depression in a body of water so that the bullets strike the water at a point other than the normal surface of the water to produce underwater sound pulses, and progressively increasing the intensity of the pulses by incrementally increasing the angle of depression of the tube in the water while the gun is firing.

One embodiment of the apparatus employed for practicing the method of the instant invention consists of an automatically fired gun mounted so that its barrel extends into a tube through a sealing tube-cap fitting. The gun and tube are rigidly mounted, in axial alignment, on a backing plate support which is rotated in a vertical plane about a pivot pin mounted on a vessel. Air is supplied to the tube so that the water within the tube is displaced. The rotation of the backing plate is controlled by guide means so that the axis of the assembled tube and gun may be swung though an arc of about 90° from a horizontal to a vertical position, thereby varying the depth of the interface between air and water at the submerged end of the tube.

In a preferred embodiment, the aforedescribed apparatus includes annular baffle plates coaxially and selectively disposed along the length of the tube to reduce the velocity of gases evolved from the gun barrel thereby to reduce and suppress turbulence at the air-water interface at the submerged end of the tube and means for automatically maintaining the tube free of water in the event rolling of the vessel causes water to rise in the tube.

With the foregoing in mind, it is an important object of the invention to provide an improved and reliably effective method of sweeping an area of water suspected of containing acoustic mines.

Another object of the invention is to provide a new and improved method and apparatus for producing underwater acoustic signals.

A still another object of the present invention is to provide a method of mine sweeping an area of water by producing underwater acoustic signals by impact of a high velocity propelled missile with the water at a point below the normal surface of the water.

A further object of the invention is the provision of novel and reliably effective method and apparatus for producing modulated underwater acoustic signals.

A still further object of the invention is to form an air-filled concavity extending from the surface of the water to a finite depth and propelling missiles therethrough to produce acoustic signals upon impact of the missiles with the water at the predetermined depth.

Another further object of the invention is to produce modulated acoustic underwater signals by forming, in a body of water, an air-filled cavity of finite depth, propelling a plurality of missiles at predetermined rates to produce acoustic signals upon impact with the water at the finite depth, and modulating the acoustic signals produced thereby by selectively varying the finite depth.

Another object of the invention is to produce underwater acoustic signals in a body of water by impact of missiles with the body of water at a point other than the surface of the water.

A primary object of the invention is to produce underwater acoustic signals by partially extending a hollow tube into a body of water suspected of containing acoustic mines, supplying air under pressure to the tube so as to displace the water therewithin, and propelling missiles through the tube to produce underwater acoustic signals upon impact with the water at the submerged end of the tube.

An essential object of the invention resides in the provision of a machine-gun automatically fired by programming means and rigidly mounted on pivoting support means with the barrel of the machine-gun extending slightly into the interior of a hollow tube through an aperture in a closure plate sealing one end of the tube, to form a swinging gun-tube assembly the tube being rigidly mounted on the aforementioned support means in axial alignment with the machine-gun, and compressor means for supplying air under pressure to the interior of the tube.

A significant object of the invention is to provide, in the aforedescribed gun-tube assembly, means for automatically increasing the air pressure supplied to the tube from the compressor, and annular baffle plates disposed at discrete points within the interior of the tube to reduce the velocity of gases evolved from the gun barrel during firing of the gun.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 2 is a box diagram showing the general arrangement of the basic concept of the apparatus of the instant invention;

FIG. 6 illustrates a preferred embodiment of the invention incorporating a bell housing at the submerged end of the hollow tube and automatic air-pressurizer means;

FIG. 7 is a cross-sectional view taken along the longitudinal axis of the tube of FIG. 6 to illustrate the internal construction thereof;

FIG. 8 is an end view showing the tapered fairings mounted on the hollow tube; and FIG. 9 shows impulse waveforms appearing at the mine mechanism in response to programs of modulated and unmodulated acoustic signals and illustrate a comparison between modulated and unmodulated programs produced in accordance with the instant invention.

Figure 1:
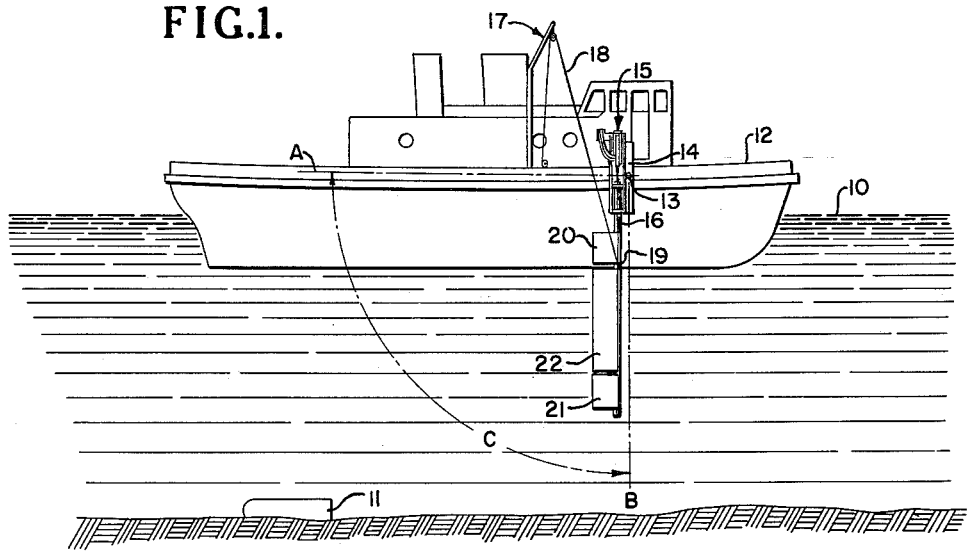
FIG. 1 illustrates a side elevation of a vessel upon which the apparatus of the instant invention is mounted taken across a cross-sectional view of the water.

Referring now to the drawings, wherein like reference characters designate like or corresponding parts throughout the several views, there is shown in FIG. 1, which illustrates a cross-sectional view through a body of water 10 having a mine 11 laid therein, a mobile vessel 12 having a shaft 13 extending perpendicularly and outwardly from the side of the vessel and upon which shaft a backing plate 14 is pivotally mounted for swinging movement in a vertical plane substantially parallel to the direction of travel of the vessel and perpendicular to the axis of shaft 13. A machine-gun, indicated generally as 15, is rigidly secured to backing plate 14 by any suitable means and has the muzzle of the barrel extending into one end of a hollow tube 16 in axial alignment therewith, tube 16 being rigidly secured to backing plate 14 by means of tube clamps and being shown with the major portion thereof vertically submerged in the body of water 10.

On board the vessel 12, there is provided a power winch with blocks and pulleys, generally indicated as 17, for winding and unwinding a cable 18 having one end securely attached to tube 16 at a point 19 for swinging the gun-tube-backing plate assembly about shaft 13 whereby the aforestated assembly may conveniently be swung about shaft 13 as a pivot through a 90° arc, indicated as C, from a horizontal position A to a vertical position B thereby to selectively vary and control the depth of submergence of the tube 16. It is to be understood that the gun-tube assembly is mounted at such elevation on the side of vessel 12 with respect to the surface of water 10 that at no time is the upper end, through which the gun barrel extends, of tube 16 ever submerged in water. In order to facilitate lowering and raising of the above mentioned assembly by reducing the drag on tube 16, there is provided a system of tapered-hollow fairings comprising an elongated section 22, hingedly mounted by any suitable means on tube 16 for swivelling movement about tube 16 as an axis, and sections 20 and 21 rigidly secured to tube 16 on opposite sides of section 22, the tapered edge of the fairings defining the trailing edge of the tube-fairing assembly as the tube-fairing assembly is lowered in the water. FIG. 8, an end view of tube 16, illustrates the tapered configuration of the fairings. Although fairings are preferably employed, it is to be understood that fairings are employed to prevent the tube 16 from being buoyed up by water pressure as the tube is being lowered in the water and can be omitted, if desired, if a sufficiently heavy tube is employed or if motive means are employed to lower the tube, as will be sequently described with respect to FIG. 4.

Referring to FIG. 2, there is illustrated the basic concept of the apparatus utilized in accordance with the invention to practice the mine sweeping method of the invention. The present invention contemplates the utilization of a programmer 25 for successively energizing relay RL1 at predetermined time spaced intervals to close contacts 28—29 of switch S1, which switch closes the firing circuit (not shown) of the gun 15, to fire the gun 15 through a program of different firing rates with a predetermined number of rounds at each firing rate. The programmer 25 is preferably of the electronic type, as described in the copending application Serial No. 425,057, filed April 22, 1954, of Norman Taslitt, which utilizes a selectively variable frequency pulse oscillator controlled by programming timing means for changing the frequency of the oscillator at preselected periods of time in accordance with the number of pulses desired to be produced at each frequency. In lieu of an electronic programmer, a mechanical cam and gearing arrangement driven by a motor may be employed to close the gun's firing circuit switch S1. In such a mechanical arrangement, the cam may have a plurality of preselectively spaced teeth for closing switch S1 through a desired program of firing rates; and, the gearing arrangement may be such as to vary the speed of rotation of the cam, thereby varying the frequency of cam actuations of the switch S1 by the teeth on the cam. Also, the programmer 25 need not necessarily fire the gun through a program of different firing rates but may fire single shots at uniformly time-spaced intervals. Moreover, although a programmer is preferably utilized, the gun 15 may be fired manually through a program of rounds by manually trigger-firing a series of single shots at decreasing intervals of time, or the gun 15 may be fired manually through a series of uniformly spaced single shots by manually holding the trigger in the depressed condition to fire the gun at its normal rate of fire.

The gun 15 may be a 30 or 50 calibre machine-gun, air-cooled or water-cooled, or may be a 20 millimeter machine-gun. Also, the machine-gun may be of the solenoidally operated type or of the electric primed type. As a matter of fact, a conventional rifle having a suitable triggering means responsive to any of the above described programmers would satisfactorily serve the purpose of producing a program of acoustic signals in accordance with the invention, or a conventional rifle may be manually fired at substantially uniformly time spaced intervals or at varying intervals of time, as may be desired.

The gun barrel 32, which may have an appreciable portion thereof surrounded by either an air-cooled or water-cooled jacket 31, extends through an aperture in a closure plate at the upper end of a hollow cylindrical tube 16, of a non-frangible material such as steel, stainless steel, or the like, which is adapted to have a substantial portion thereof submerged in water, the lower end of tube 16 being open. In order to displace the water within tube 16 when submerged in a body of water, air is supplied to tube 16 from a compressor 35 through tubing 34 which extends through the closure plate at the upper end of tube 16, a gage 36 indicating the air pressure supplied by compressor 35. Although a fairly large volume of air is required to keep the tube 16 clear of water, only a low pressure is necessary, a compressor furnishing 5 to 20 cubic feet of air per minute at a pressure of 50 to 100 p.s.i. sufficing for this operation. A gage 40 is connected through conduit 38 to tube 16 to show the air pressure in tube 16 at all times, the air pressure reading on gage 40 being an approximate indication of the water level in tube 16 since every 0.5 p.s.i. reading on gage 40 represents an approximate displacement of one vertical foot of water in tube 16. For example, if tube 16 is 15 feet long and 10 feet of it is vertically submerged in water, a reading of approximately 5 p.s.i. on gage 40 would indicate that substantially all the water within tube 16 is displaced.

Since the amplitude and consequently the range of propagation of acoustic signals produced underwater is determined by the depth at which these signals are produced, the length of tube employed in accordance with the invention is dictated by the range desired to be covered and by the type of operation, mine-sweeping or rendering passive, to be performed. To render a mine passive within a range of 300 yards, a tube having an overall length such that a length of 5 feet thereof is submerged will suffice. A tube having a length such that 14 feet thereof is submerged has been adequate to fire mines within a range of 400 to 2000 yards and to ACM mine mechanisms up to a range of 400 yards. For general practical applications, a tube having an overall length such that 20 to 25 feet thereof may be submerged is preferable, since a tube within this submergence range has an effective mine firing range in excess of 3000 yards. Also, in order to avoid bullets striking the walls of the tube due to the natural dispersion of the bullets as they travel through the tube, the diameter of the tube is determined by the length of the tube employed. One example of tube which has been found satisfactory is a tube 14 feet long, and six inches in outside diameter with one-half inch thick walls. Another example is a 22 foot long tube with an outside diameter of 9 inches and one-half inch thick walls. Optimum results are obtained with these tubes when the reading on gage 36 of compressor 35 is between 60 to 80 p.s.i. The tube 16, if desired may have markings exteriorly painted thereon to indicate the depth of submergence.

METHODS

(A) *Rendering Passive*

In practicing the mine-passive-rendering method, with the vessel 12 moving toward the mine field the tube 16 is submerged in water, vertically if the tube is short or at an angle if the tube is long, depending on the range and water depth desired, a manual compressor valve (not shown) is opened to permit compressor 35 to supply air under pressure to tube 16 through conduit 34 to displace the water from tube 16, as indicated by gage 40, to thereby form an air filled cavity extending from the surface of the body of water 10 to the submerged end of tube 16 to form thereat an air-water interface, and firing bullets from gun 15 through tube 16 at uniform time spaced intervals to produce, upon impact with the body of water 10 at the aforesaid air-water interface, substantially equally time spaced acoustic pulse signals of substantially constant and relatively strong amplitude, as shown in FIG. 9(b). Although a series of bullets are preferably fired, it is to be understood that a single bullet fired through the water-evacuated tube 16 is sufficient to ACM mines. Attention is directed to the fact that, if the vessel 12 is stationary during the firing of a series of bullets, the first pulse produced is strong but succeeding pulses are slightly weaker. This is due to entrapment of air in the cavitation bubbles previously produced by preceding bullets striking the water at the air-water interface. This condition is remedied by moving vessel 12 fast enough so that succeeding bullets strike "new" water.

(B) *Mine Sweeping*

In order to mine sweep an area, with vessel 12 moving toward the mine area tube 16 is submerged in the water 10 at an angle of depression of about 25° and water displaced therefrom as aforedescribed. The machine gun is then fired at progressively decreasing intervals, and, as the gun is firing, the angle of depression of tube 16 is gradually increased until it attains a vertical position within a period from 6 to 12 seconds. This results in the production of acoustic pulses of succedently decreasing time spaced intervals and of increasing amplitude, as shown in FIG. 9(a), thereby simulating signals of increasing frequency and amplitude produced by a vessel approaching a mine.

In lieu of gradually decreasing time intervals, the machine gun may be fired through a program of progressively increasing groups of bullets, each group firing a predetermined number of rounds at uniformly time spaced intervals. For example, the program may consist of 10 rounds at a rate of 120 rounds per minute, followed by 15 rounds at 150 rounds per minute, and thereafter by 5 rounds at 700 rounds per minute. It is to be understood that this program is only exemplary and any combination of groups, rounds and rates may be employed, since some types of mine mechanisms require only that succeeding groups are fired at increasing rates of fire while other mine mechanisms require that a predetermined series of succeeding groups be fired at increasing rates of fire followed by a subsequent series of groups of decreasing rates of fire.

Although it is preferable to increase the depth of submergence of the tube to produce signals of increasing intensity, it is not a necessity to do so to actuate mine-firing mechanisms since in some instances, simply increasing the rate of fire as the vessel 12 moves toward the mine field is sufficient to fire mines. This is due to the fact that the increasing rates of fire cause a sufficiently rapid voltage build-up in the mine firing mechanism, which rapid voltage build-up eventually actuates the firing mechanism.

Figure 3:
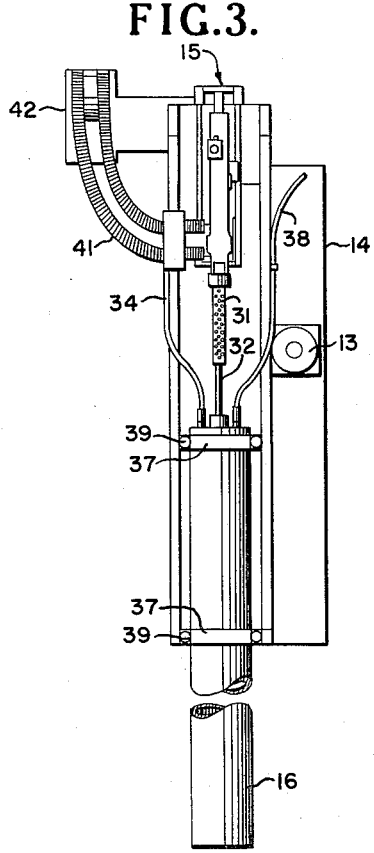
FIG. 3 is a plan view of one embodiment of a machine-gun and hollow tube assembly mounted on a backing plate, in accordance with the invention.
Figure 5:
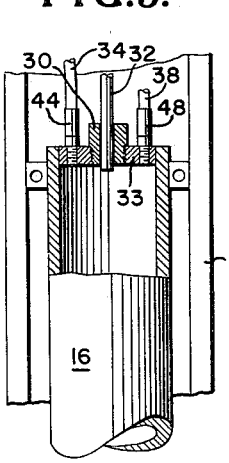
FIG. 5 is an enlarged fragmentary view of FIG. 3 showing the details journalling the gun-barrel and pressure-gage tubes in the closure plate at the upper end of the hollow tube.
Figure 4:
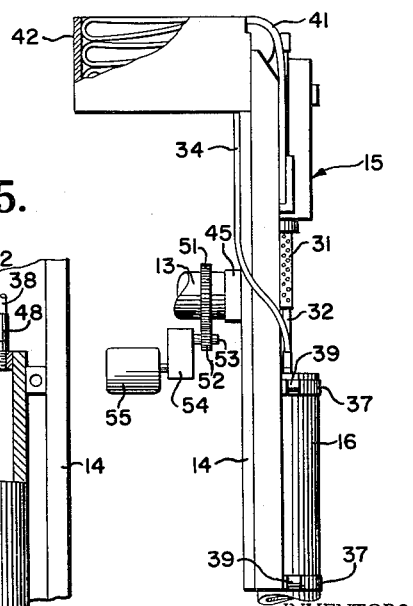
FIG. 4 is a side elevation of FIG. 3.

Referring now to FIGS. 3, 4 and 5, wherein is shown one embodiment of the apparatus of the invention, a machine-gun 15 is securely mounted on a backing plate 14 on which is also mounted an ammunition box 42 for providing an ammunition belt 41 to gun 15. A hollow tube 16 is rigidly secured to backing plate 14 by tube clamps 37 bolted on plate 14 by means of bolts 39, the clamps 37 facilitating replacement of tubes of various sizes. The machine-gun 15 and tube 16 are mounted on backing plate 14 so that the barrel 32, partially surrounded by a cooling jacket 31, is in axial alignment with tube 16 and slightly extends into tube 16 through a sealing cap 33 by means of a cap fitting 30 to prevent air leakage when compressor 35 is supplying air to tube 16. Conduits 34 and 38 are secured to apertures in cap 33 by suitable couplings 44 and 48, respectively.

In lieu of the power winch and cable arrangement discussed herein above with respect to FIG. 1, a motor-driven gearing arrangement may be provided to raise and lower the gun-tube assembly through its 90° arc. For example, as shown in FIG 4, shaft 13 may be welded to backing plate 14 and may have a gear 51 keyed thereto to rotate shaft 13 upon rotation of gear 51, and a gear 52, mounted on a shaft 53 controlled by a gear-box 54 which is driven by motor 55, is provided to drive gear 51. The gear box 54 may be such as to limit rotation of shaft 13 so that the axis of tube 16 may be varied within the arc C (FIG. 1).

Instead of using motor power means to drive gear 51, this may be accomplished by means of a hand crank coupled to gear 51 through suitable gearing means, or may be accomplished by a suitable hydraulic of pneumatic system.

Referring now to FIGS. 6 and 7, wherein components similar to FIGS. 3, 4, and 5 have corresponding reference numerals, there is shown a preferred embodiment of the invention incorporating an enlarged cylindrical bell housing 65 at the base of tube 16 for amplifying the produced acoustic signals and means for automatically increasing the air supplied under pressure to tube 16 when water rises therein due to rolling of the vessel carrying the assembly. Air emanating from compressor 35 through conduit 60 flows also through conduit 61 which is connected to a normally closed automatic valve A—V, which is of the solenoidally operated type manufactured by the Automatic Switch Co., the other side of the valve A—V being connected to conduit 34 through conduit 63. A hand-valve V connects conduit 60 to conduit 34 to enable manual control of the air flow from compressor 35. Conduit 34 is arranged to supply air not only through closure plate 33, as in FIG. 3, but also through aligned equi-spaced apertures 68 along the longitudinal length of tube 16 and at the upper end of housing 65. The spacing of apertures 68 along the tube 16 may be 4 or 5 feet, for example. At the base end of housing 65, there is provided a ring-shaped plate 66, which may be welded to housing 65 or may be integral therewith, the inner diameter of plate 66 being equal to the inner diameter of tube 16 to thereby define a substantially bell-shaped chamber having an output orifice 67 for improving coupling between the missile and sound energies in the water thereby amplifying the acoustic signals produced thereat.

A pair of annular baffle plates, 64 and 69, are coaxially disposed internally of tube 16 at selected positions, preferably every 9 or 10 feet, along the length of tube 16 to present obstructions to the gases evolving from gun barrel 32 as gun 15 fires, whereby the flow of gases is sufficiently impeded by plates 64 and 69 as to substantially suppress the generation of water turbulence at the air-water interface at housing 65 due to high-velocity gases striking the air-water interface.

A pair of conductive electrodes, 70 and 71, are insulatably mounted in spaced alignment through suitable apertures in the side wall of housing 65 by means of insulating couplers 76 and 78, respectively, in such a manner that electrodes 70 and 71 present exposed portions thereof only to the interior of housing 65. Arcuate-shaped splash-pans, 80 and 82, are welded to housing 65 below electrodes 70 and 71, respectively, to prevent water from splashing thereon due to water agitation caused by impact of bullets with the air-water interface.

Electrodes 70 and 71 are connected by leads 84 and 86, shielded throughout their length by insulators 72 and 74 respectively, lead 86 being connected to one end of the winding on relay RL2 and lead 84 being connected to the other end of the winding of relay RL2 through a power supply 85 to form a normally open series circuit. Actuation of relay RL2 closes contacts 89 and 90 of switch S2 to apply operating potential from A.C. source 95 to the solenoid (not shown) of automatic valve A—V to actuate the solenoid so as to open the valve A—V to thereby increase the air-flow from compressor 35 through conduit 34 as long as switch S2 remains closed.

In operating the system of FIGS. 6 and 7, with tube 16 submerged in any of the aforedescribed positions, hand-valve V is opened to permit the desired air-flow therethrough as indicated by gage 40 and is then maintained in the desired open position. The gun 15 is fired through any of the aforedescribed methods with tube 16 stationary or gradually depressed, depending on whether the ACM or the mine-firing operation is desired. If the vessel 12 should roll during firing of the gun 15, water will rise within housing 65 and close the aforementioned normally opened series circuit by fluidly bridging electrodes 70 and 71. This actuates relay RL2 to close switch S2, upon which closure the solenoid of valve A—V is actuated to open valve A—V so as to cause a surge of air-flow through conduit 61, valve A—V, and conduits 63 and 34, thereby instantaneously displacing the water within housing 65. Upon displacement of the water within housing 65, the aforementioned series circuit is opened, thereby deenergizing the solenoid of valve A—V to close valve A—V. It is to be understood that the system of FIGS. 6 and 7 is adaptable to practice any and all of the afore-described ACM and mine-firing methods.

Although various length tubes may be employed in the system of FIGS. 6 and 7, it is preferable to employ a tube having an inside diameter of 7¾ inches with one-half inch thick walls and an overall length of 29 feet with housing 65 forming one-half foot to one foot thereof, the inside diameter of housing 65 being about one foot with the inside diameter of ring-shaped member 66 being 7¾ inches. Electrode 71 being approximately one inch above ring-member 66, and electrode 70 being spaced about 3 inches above electrode 71. With compressor 35 delivering 5 cubic feet of air per minute at 70 p.s.i. to a tube with these dimensions mine actuations have been obtained up to a range of 6500 yards.

From the foregoing, it is apparent that the invention provides a new and improved method of producing underwater acoustic signals by the utilization of novel apparatus for displacing a volume of water to define an air-filled cavity in a body of water and propelling missiles through the cavity to produce acoustic signals upon impact with water. It is also apparent that the invention provides automatic water displacing means to compensate for sporadic increases in water level within the formed cavity.

As heretofore set forth with greater particularity, a mine may be rendered passive by one method of practicing this invention or swept by another method of this invention. It will be understood by one skilled in the art that both the rendering passive and mine sweeping methods can be combined to effect safe passage of the sweeping vessel by self protection while engaged in sweeping mines at safe distances from the vessel.

Whereas the invention has been described with particularity with reference to a tube carried outboard by the vessel, it will be understood that various other structures and arrangements may be employed, for example, the tube may be extendable through a sea chest from inboard of the vessel, if desired.

Obviously many modifications and variations of the present invention are possible in the light of the above teachings. It is therefore to be understood, that within the scope of the teachings herein and the appended claims, the invention may be practiced otherwise than as specifically described.

What is claimed and desired to be secured by Letters Patent of the United States is:

1. Apparatus for producing underwater acoustic signals in a body of water comprising, in combination, a hollow tube adapted to be partially submerged in said body of water in such a manner that an open end thereof is completely submerged and the other end extends above the surface of said body of water, said other end having a closure plate with an aperture, means for supplying air under pressure to the interior of said tube when partially submerged in said body of water to initially displace the water contained within said tube and form an air-filled chamber therewithin to define an air-water interface with said body of water at said one end, and missile ejecting means mounted in said aperture for propelling missiles through said air-filled chamber to produce acoustic signals upon impact with said body of water.

2. Apparatus for producing underwater acoustic signals comprising, in combination, a machine-gun assembly including a machine-gun and an elongated hollow tube of greater cross-section than the barrel of said machine-gun, said tube having an open end and a closed end with a coaxial aperture formed in said closed end for conformingly receiving the barrel of said machine-gun to form therewith an enlarged extending barrel section of which, a substantial portion thereof is positioned under operating conditions for submergence in a body of water with the open end thereof being submerged, a backing plate having said assembly rigidly attached thereto, pivotal supporting means upon which said backing plate is mounted for swinging movement through an arc of 90° in a vertical plane, guide means for selectively swinging said backing plate through said arc, means for supplying air under pressure to the interior of said tube when said tube is submerged in water to thereby displace the water contained therein due to said submergence, and means for selectively firing said machine-gun.

3. The apparatus of claim 1 further including hollow tapered fairings mounted on said tube to facilitate the submergence thereof in water.

4. The apparatus of claim 1 wherein said missile ejecting means comprises the combination of a machine-gun and an automatic programmer for firing the machine-gun through a program of preselected firing rates with a predetermined number of rounds at each firing rate.

5. The apparatus of claim 4 wherein said means supplying air under pressure comprises a compressor delivering from 5 to 20 cubic feet of air at a pressure of 50 to 100 pounds per square inch.

6. The apparatus of claim 5 further including an air pressure gage connected to said tube to indicate the air pressure therein.

7. The apparatus of claim 5 wherein the longitudinal length of said tube is at least fifteen feet.

8. The apparatus of claim 5 wherein said tube has an enlarged section at said one end to amplify acoustic signals produced at said air-water interface.

9. The apparatus of claim 8 further including automatic valve means operatively associated with said compressor to instantaneously increase the air pressure supplied to said tube in the event water rises in said tube after said initial displacement of water.

10. The apparatus of claim 9 wherein said automatic valve means comprises the combination of a solenoidally controlled valve means, a normally open switch, a source of energizing potential for operating said solenoidally controlled valve means and electrically connected thereto through said normally open switch, electro-responsive means adapted to close said switch upon energization thereof, an electrical power source for energizing said electro-responsive means, a pair of electrodes insulatably mounted in spaced relation at said one end of said tube to present conductive portions thereof only to the interior of said tube, circuit means connecting said electro-responsive means in series with said power source and said pair of electrodes to form a normally non-conductive series circuit which is rendered conductive upon water rising sufficiently in said tube to bridge said pair of electrodes, and splash pan means disposed in contiguous relation to said electrodes to prevent sporadic water turbulence from actuating said series circuit.

11. The apparatus of claim 10 further including annular baffle plates disposed interiorly of said tube at predetermined positions along the longitudinal length thereof to reduce the velocity of the gases evolved from said machine-gun during the firing thereof thereby to reduce water turbulence at said air-water interface due to the rapid expulsion of said gases.

12. In combination with a vessel traversing a body of water for sweeping or rendering passive mines immersed in said body of water by the utilization of underwater acoustic signals, apparatus for producing underwater acoustic signals comprising a shaft extending outwardly from the side of said vessel, a plate mounted on said shaft for rotation thereon in a plane perpendicular to the axis of said shaft, a gun rigidly mounted on said plate with the barrel thereof being disposed parallel to the plane of rotation of said plate, a cylindrical elongated open-ended hollow tube of uniform cross-section greater than the cross-section of said gun barrel, means for rigidly mounting said tube in coaxial alignment with said gun barrel and so disposed as to have the muzzle of said gun barrel slightly protruding into the interior of said tube through one end thereof, a closure plate sealing said one end and having a first coaxial aperture for conformingly receiving the muzzle of said gun barrel and second and third apertures spaced from said first aperture, the other end of said tube remaining open, said plate in conjunction with said tube and gun forming a unitary assembly, assembly positioning control means for selectively guiding the rotation of said plate in such a manner that the longitudinal axis of said tube and gun may be selectively positioned through a 90° arc extending from a horizontal position to a vertical position, said assembly being so positioned on the vessel relative to the surface of said body of water and said tube being of such length that, when said assembly is positioned with the axis of said tube at a depressed angle of 20° with respect to the horizontal, said other end of said tube is slightly submerged in said body of water and that, when said assembly is positioned with the axis of said tube in a vertical position, a major portion of said tube is submerged in said body of water, fairings on said tube to facilitate the submergence thereof in said body of water, compressor means for supplying air under pressure to the interior of said tube through conduit means connected to said second aperture whereby water is displaced from said tube when submerged in said body of water to define an air-water interface at said one end of said tube, pressure gage means connected to said third aperture through conduit means for indicating the air pressure within said tube and, correlatively, the water level in said tube, and means for selectively firing said gun to produce acoustic signals upon impact of the bullets ejected from said gun with the air-water interface formed at said one end of said tube.

References Cited in the file of this patent

UNITED STATES PATENTS

| | | |
|---|---|---|
| 2,353,360 | Ronning | July 11, 1944 |
| 2,397,209 | Schaelchlin | Mar. 26, 1946 |
| 2,398,753 | McCarter | Apr. 16, 1946 |
| 2,668,512 | Klas | Feb. 9, 1954 |